United States Patent
Kim et al.

(10) Patent No.: US 12,320,644 B2
(45) Date of Patent: Jun. 3, 2025

(54) OPTICAL FIBER SENSOR-BASED INERTIAL MEASUREMENT SYSTEM

(71) Applicant: KOREA INSTITUTE OF SCIENCE AND TECHNOLOGY, Seoul (KR)

(72) Inventors: Jinseok Kim, Seoul (KR); Byung Kook Kim, Seoul (KR); Minsu Jang, Seoul (KR); Hyowon Moon, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 236 days.

(21) Appl. No.: 18/087,542

(22) Filed: Dec. 22, 2022

(65) Prior Publication Data

US 2023/0204360 A1 Jun. 29, 2023

(30) Foreign Application Priority Data

Dec. 23, 2021 (KR) .................. 10-2021-0185980

(51) Int. Cl.
*G01C 19/64* (2006.01)
*G01P 15/03* (2006.01)
*G01P 15/18* (2013.01)

(52) U.S. Cl.
CPC .............. *G01C 19/64* (2013.01); *G01P 15/03* (2013.01); *G01P 15/18* (2013.01)

(58) Field of Classification Search
CPC ......... G01C 19/64; G01C 21/16; G01P 15/03; G01P 15/18; G01P 15/093; G01D 5/268; G01D 5/353
See application file for complete search history.

(56) References Cited

U.S. PATENT DOCUMENTS

| | | | |
|---|---|---|---|
| 5,099,690 A | * | 3/1992 | Califano .............. G01C 19/005 73/510 |
| 9,304,018 B2 | | 4/2016 | Davis et al. |
| 11,047,687 B2 | | 6/2021 | Feke |
| 2007/0163346 A1 | | 7/2007 | Platt et al. |

(Continued)

FOREIGN PATENT DOCUMENTS

| | | | |
|---|---|---|---|
| CN | 101210937 A | * | 7/2008 |
| CN | 107389062 A | | 11/2017 |

(Continued)

OTHER PUBLICATIONS

Fang et al. (Coupled Dynamic Analysis and Decoupling Optimization Method of the Laser Gyro Inertial Measurement Unit. Sensors 2020, 20, 111.) (Year: 2019).*

(Continued)

*Primary Examiner* — Tarifur R Chowdhury
*Assistant Examiner* — Akbar H. Rizvi
(74) *Attorney, Agent, or Firm* — NSIP Law

(57) ABSTRACT

Embodiments relate to an Inertia Measurement Unit (IMU) sensor that generates strain information including a change in strain based on first output light of a first type of optical fiber sensing unit, calculates acceleration information of an object on which an IMU sensor (10) is mounted based on the strain information, generates angular velocity information based on output light of a second type of optical fiber (Continued)

sensing unit, and calculates angle information of the object based on the rotational speed information.

18 Claims, 10 Drawing Sheets

(56) References Cited

U.S. PATENT DOCUMENTS

| | | | | |
|---|---|---|---|---|
| 2011/0122417 | A1* | 5/2011 | Molin | G01D 5/268 |
| | | | | 356/478 |
| 2014/0218739 | A1* | 8/2014 | Bergh | G01C 19/72 |
| | | | | 356/460 |
| 2015/0124266 | A1* | 5/2015 | Davis | A61B 5/1079 |
| | | | | 356/601 |
| 2016/0265990 | A1* | 9/2016 | Carralero | G01L 1/247 |
| 2016/0313125 | A1* | 10/2016 | Taranta | G01C 19/726 |
| 2019/0353482 | A1* | 11/2019 | Feke | G01C 19/728 |

FOREIGN PATENT DOCUMENTS

| | | |
|---|---|---|
| KR | 10-2007-0076546 A | 7/2007 |
| KR | 10-2022-0017732 A | 2/2022 |
| WO | WO 2013/131197 A1 | 9/2013 |

OTHER PUBLICATIONS

English Translation of Dong et al. CN101210937A Description (Year: 2008).*

Cardou et al. "A nonlinear program for angular-velocity estimation from centripetal-acceleration measurements." *IEEE/ASME Transactions on Mechatronics* vol. 16 Issue 5. (Aug. 19, 2010): pp. 932-944.

"EN-300 Precision Fiber Optic Inertial Measurement Unit (IMU)" *Datasheet. EMCORE corporation* May 5, 2022, https://emcore.com/products/en-300-precision-fiber-optic-inertial-measurement-unit/ pp. 1-2.

"High Performance Advanced MEMS Industrial & Tactical Grade Inertial Measurement Units. IMU-P", *Datasheet Rev 3.2. Inertial Labs*, https://www.inertiallabs.com/wp-content/uploads/2022/10/IMU-P_Datasheet.rev4 _.2_Oct5_2022.pdf; pp. 1-5.

Fang, Fang, et al., "Coupled Dynamic Analysis and Decoupling Optimization Method of the Laser Gyro Inertial Measurement Unit." Sensors 20.1 (2019): 111., (24 pages).

Korean Office Action Issued on Feb. 2, 2024, in Counterpart Korean Patent Application No. 10-2021-0185980 (6 Pages in English, 6 Pages in Korean).

* cited by examiner

OPTICAL FIBER SENSOR-BASED INERTIAL MEASUREMENT SYSTEM

DESCRIPTION OF GOVERNMENT-FUNDED RESEARCH AND DEVELOPMENT

This research is conducted under the support of Ministry of Science and ICT, Ministry of Trade, Industry and Energy, Ministry of Health and Welfare, Ministry of Food and Drug Safety, Collaborative Lifecycle Medical Device Research and Development Program [Program Name: Development of 3D navigation system with real-time human body deformation modeling, Project Number: 1711138281, Program Serial Number: KMDF_PR_20200901_0145].

CROSS-REFERENCE TO RELATED APPLICATION

This application claims priority to Korean Patent Application No. 10-2021-0185980, filed on Dec. 23, 2021, and all the benefits accruing therefrom under 35 U.S.C. § 119, the contents of which in its entirety are herein incorporated by reference.

BACKGROUND

1. Field

Embodiments relates to an optical Inertia Measurement Unit (IMU) sensor, and more particularly, to an optical fiber sensor-based IMU sensor capable of measuring acceleration and angular velocity.

2. Description of the Related Art

Inertia Measurement Unit (IMU) sensors are widely used as accelerometers and sensors for measuring the rotational speed. In general, IMU sensors are manufactured using Micro Mechanical System (MEMS) technology, and configured to electrically/electronically measure the acceleration and rotational speed.

However, MEMS based IMU sensors are greatly affected by electromagnetic fields. Accordingly, errors occur in measurement environments in which objects are exposed to high intensity electromagnetic fields, and the errors are accumulated over time, leading to drift.

SUMMARY

To overcome the above-described limitation, according to an aspect of the present disclosure, there is provided an optical Inertia Measurement Unit (IMU) sensor for measuring acceleration/angular velocity information using a first type of optical fiber sensing unit to detect a change in strain and a second type of optical fiber sensing unit to detect a change in rotational speed induced by acceleration on a single sensor substrate and a motion capture device including the same.

The IMU sensor according to an aspect of the present disclosure may be attached to an object to capture a motion of the object by measuring the acceleration and angular velocity.

The IMU sensor avoids the accumulated error over time or drift by the magnetic fields even though there are strong magnetic fields in measurement environments.

Additionally, the IMU sensor with compact layout of meters and internal components is configured to wirelessly transmit the measurement results to an external device.

The effects of the present disclosure are not limited to the above-mentioned effects, and these and other effects will be clearly understood by those skilled in the art from the appended claims.

BRIEF DESCRIPTION OF THE DRAWINGS

The following is a brief introduction to necessary drawings in the description of the embodiments to describe the technical solutions of the embodiments of the present disclosure or the prior art more clearly. It should be understood that the accompanying drawings are for the purpose of describing the embodiments of the present disclosure and are not intended to be limiting of the present disclosure. Additionally, for clarity of description, illustration of some elements in the accompanying drawings may be exaggerated and omitted.

DETAILED DESCRIPTION

The term "comprising", "comprises", "including" or "includes" when used in this specification, specifies the presence of stated features (for example, integers, functions, operation, steps, components, elements and/or constituents), but does not preclude the presence or addition of one or more other features.

It should be understood that when an element is referred to as being "connected to" or "coupled to" another element, it can be directly connected or coupled to the other element or intervening elements may be present. In contrast, it should be understood that when an element is referred to as being "directly connected to" or "directly coupled to" another element, there is no intervening element.

The terms "first", "second" or the like when used in various embodiments may describe various elements irrespective of the order and/or importance, and do not limit the corresponding elements. These terms may be used to distinguish one element from another. For example, a first element and a second element may represent different elements irrespective of the order or importance.

In the specification, a device or system according to embodiments may have aspects of entirely hardware, entirely software, or partly hardware and partly software. For example, the device or system may refer collectively to hardware having the ability to process data and software that manages the hardware to enable it to function. The term "unit", "module", "device" or "system" as used herein is intended to refer to a combination of hardware and software that runs by the corresponding hardware. For example, the hardware may be a data processing device including Central Processing Unit (CPU), Graphic Processing Unit (GPU) or any other processor. Additionally, the software may refer to a process being executed, an object, an executable, a thread of execution and a program.

The term "configured to (or set to)" as used herein may be, for example, interchangeably used with "suitable for", "having the capacity to", "designed to", "adapted to", "made to" or "capable of" depending on situations. The term "configured to (or set to)" may not necessarily represent "specifically designed to" in hardware. Instead, in a certain situation, the term "a device configured to" may represent that the device may work with other devices or components. For example, the phrase "a processor configured (or set) to perform A, B, and C" may refer to a dedicated processor (for example, an embedded processor) for performing the corresponding operation, or a generic-purpose processor (for example, a CPU or an application processor) capable of performing the corresponding operations by running at least one software program stored in a memory device.

Hereinafter, the embodiments of the present disclosure will be described in detail with reference to the accompanying drawings.

Figure 1:
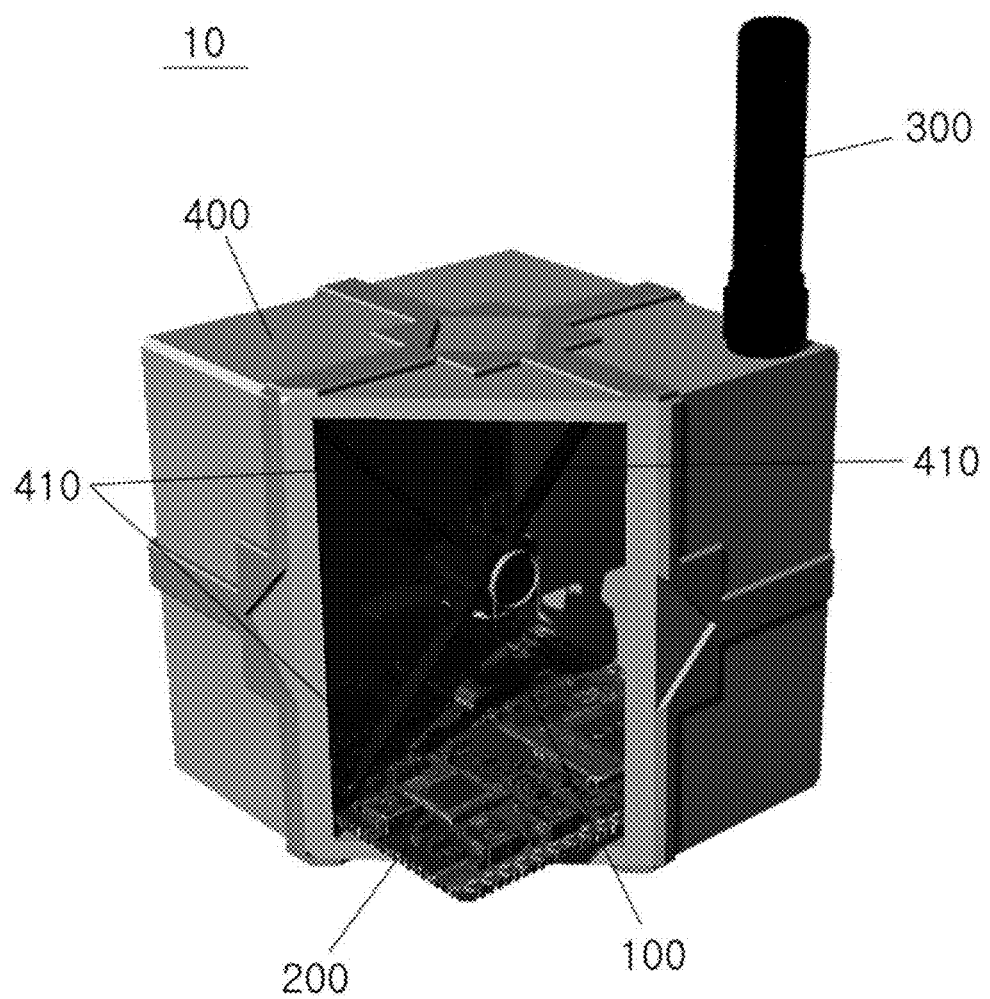
FIG. 1 is a perspective view of an Inertia Measurement Unit (IMU) sensor according to an aspect of the present disclosure.

FIG. 1 is a perspective view of an Inertia Measurement Unit (IMU) sensor according to an aspect of the present disclosure.

Referring to FIG. 1, the IMU sensor 10 includes a sensor module 100; a sensor circuit 200; and a sensor case 400. In some embodiments, the IMU sensor 10 may further include a communication module 300.

The IMU sensor 10 detects, by the sensor module 100, a change in physical information for measuring acceleration information and angular velocity information of an object on which the IMU sensor 10 is mounted.

The IMU sensor 10 detects a physical signal for calculating the acceleration/angular velocity information by the sensor module 100.

The sensor module 100 includes a first type of optical fiber sensing unit to detect a change in strain to generate first output light to be used to measure the acceleration information; and a second type of optical fiber sensing unit to detect a change in rotational speed to generate second output light to be used to measure the angular velocity information.

The IMU sensor 10 calculates, by the sensor circuit 200, the acceleration/angular velocity information of the object on which the IMU sensor 10 is mounted based on the physical signal detected by the sensor module 100. The sensor circuit 200 generates strain information including the change in strain based on the output light of the first type of optical fiber sensing unit, calculates the acceleration information of the object on which the IMU sensor 10 is mounted based on the strain information, generates rotation information based on the output light of the second type of optical fiber sensing unit, and calculates the angular velocity information of the object based on the rotation information.

The sensor module 100 and the sensor circuit 200 are configured to measure the acceleration/angular velocity for each of a plurality of axes. In certain embodiments, the sensor module 100 and the sensor circuit 200 may calculate the acceleration/angular velocity for each of three axes (x axis, y axis, z axis).

The sensor module 100 and the sensor circuit 200 will be described in more detail with reference to FIGS. 2 to 8 below.

The IMU sensor 10 is configured to transmit a transmission packet including the acceleration/angular velocity information to an external device that makes use of the acceleration/angular velocity information by the communication module 300 via wireless communication.

The communication module 300 is configured to transmit/receive electromagnetic waves representing data through antennas. The communication module 300 converts electrical signals into electromagnetic waves or electromagnetic waves into electrical signals.

The communication module 300 may communicate with other devices by various communication methods for enabling networking between objects, including wireless communication, 3G, 4G, 5G or wireless Internet. For example, the communication module 300 is configured to communicate via Internet such as World Wide Web (WWW), a network such as Intranet and/or a cellular telephone network, a wireless network and wireless communication. The wireless communication includes, for example, wireless communication standards using the communication protocols for Global System for Mobile Network (GSM), Code Division Multiple Access (CDMA), Wideband Code Division Multiple Access (W-CDMA), Time Division Multiple Access (TDMA), Bluetooth, Wi-Fi, World Interoperability for Microwave Access (Wi-MAX), and/or e-mail, instant messaging and short message service (SMS), but is not limited thereto.

The communication module 300 generates the transmission packet including acceleration data and angular velocity data of the object measured by the sensor circuit 200, and transmits the generated transmission packet to the external device.

The IMU sensor 10 protects the internal components 100, 200, 300 from the external environment by the sensor case 400. The sensor case 400 provides a housing to cover at least parts of the internal components 100, 200, 300.

The IMU sensor 10 may further include at least one support 410 to fix the sensor module 100 to a specific location. The specific location is a location at which the change in strain and the change in rotational speed experienced by the sensor module 100 can be detected relatively sensitively.

In an embodiment, the support 410 may be configured to position the sensor module 100 at the center of the internal space of the sensor case 400. The center of the internal space is the most sensitive detection location. The support 410 includes a bar portion, and is extended from the surface of the sensor case 400 to fix the sensor module 100.

Sensor Module

Figure 2:
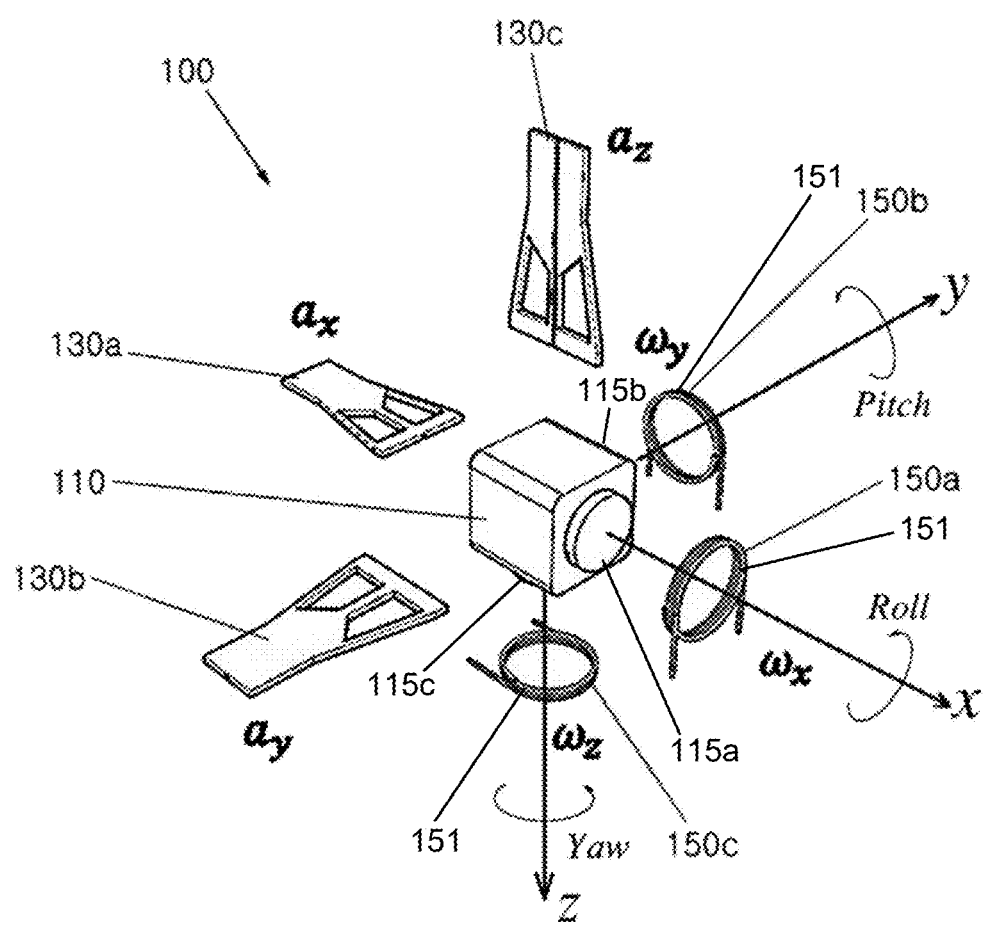
FIG. 2 is an exploded perspective view of a sensor module according to an embodiment of the present disclosure.

FIG. 2 is an exploded perspective view of the sensor module according to an embodiment of the present disclosure.

Referring to FIG. 2, the sensor module 100 includes at least one first type of optical fiber sensing unit 130; and at least one second type of optical fiber sensing unit 150. In some embodiments, the sensor module 100 may further include a core body 110.

The first type of optical fiber sensing unit 130 is a sensing unit for detecting a change in strain in response to incident light. In certain embodiments, the first type of optical sensing unit 130 may be a Fiber Bragg grating (FBG) sensing unit. The FBG sensing unit 130 acquires a shift of wavelength spectrum with a change in grating node. The change in wavelength spectrum indicates the change in strain.

The second type of optical fiber sensing unit 150 is a sensing unit for detecting a change in rotational speed in response to incident light. In certain embodiments, the second type of optical fiber sensing unit 150 may be a Fiber-Optic Gyro (FOG) sensing unit used in a FOG sensor. The FOG sensing unit 150 forms a Sagnac interferometer to acquire a phase difference. The phase difference indicates the change in rotational speed.

Hereinafter, for clarity of description, the IMU sensor 10 of the present disclosure will be described in more detail based on embodiments using the FBG sensing unit for the first type of optical fiber sensing unit 130 and the FOG sensing unit for the second type of optical sensing unit 150.

The core body 110 is coupled to the FBG sensing unit 130 and the FOG sensing unit 150 to fix the locations of the FBG sensing unit 130 and the FOG sensing unit 150.

Figure 3:
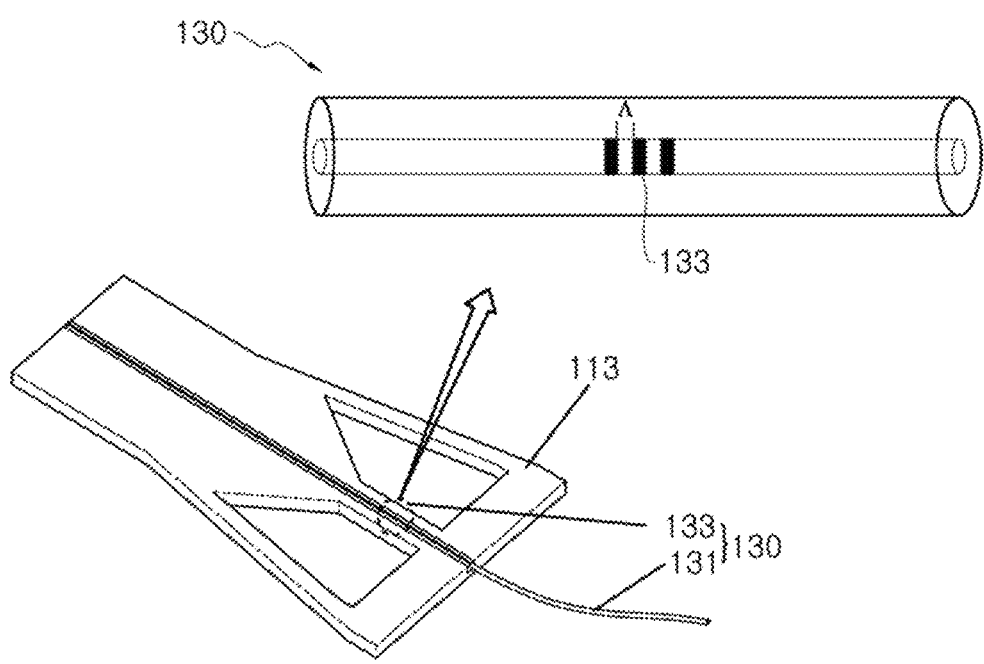
FIG. 3 shows a cantilever to couple a Fiber Bragg grating (FBG) acceleration sensing unit to a core body according to an embodiment of the present disclosure.

FIG. 3 shows a cantilever 113 to couple the FBG sensing unit 130 to the core body 110 according to an embodiment of the present disclosure.

Referring to FIG. 3, the FBG sensing unit 130 may include an optical fiber 131; and at least one grating node 133. The FBG sensing unit 130 is fixed to the core body 110 by the cantilever 113.

A grating node including a plurality of gratings is formed in a certain region of the optical fiber 131 of the FBG sensing unit 130. This grating is a region having a change in properties of the core of the region of the optical fiber 131 through ultraviolet light in the fabrication process of the optical fiber 131, and has a refractive index that is different from a cladding and a core of a different region.

Incident light entering the optical fiber 131 interacts with the grating node 133, causing interference. The reflected light from the optical fiber 131 is represented as a spectrum having a peak corresponding to each grating node 133. Here, the grating period in the grating node 133 and the wavelength of the reflected light have a proportional relationship.

The FBG sensing unit 130 including the optical fiber 131 is coupled to the core body 110 through the cantilever 113.

The cantilever 113 includes one surface extended from one end to the other end. The cantilever 113 may be a planar structure including a portion having a smaller distance between one side and the other side of the corresponding cantilever. One end of the cantilever 113 is coupled to the core 110, and the other end is not fixed. The core body may include one surface having a wider area than the other surface. The core body has at least one hole on the surface, and at least one of the plurality of cantilevers is coupled to the core body such that the cantilever is located at the hole.

The cantilever 113 may be made of a material that allows the unfixed other end to move and bend in upward/downward direction. The cantilever 113 includes various types of deformable materials, for example, a flexible material. The flexible material includes most of materials having elastic properties except a ceramic material, and may include, for example, various types of polymer materials such as UV epoxy and ethyl vinyl ether (EVE). However, the flexible material is not limited thereto, and in addition to the polymer material, the flexible material may include various types of nonmagnetic metallic materials that can be used in forming and/or 3D printing, for example, polycarbonate (PC), polyether ether ketone (PEEK), Vero, Tango, carbon steel and spring steel.

The FBG sensing unit 130 is installed to detect the lengthwise strain of the cantilever 113. The FBG sensing unit 130 is installed in the cantilever 113 such that the grating period in at least one grating node changes depending on the acceleration applied to the IMU sensor 10.

One end of the FBG sensing unit 130 is connected to the sensor circuit 200 through the hole in the core body 110, and the other end of the FBG sensing unit 130 is disposed along the cantilever 113 toward the unfixed other end of the cantilever 113.

The FBG sensing unit 130 may be disposed on one surface of the cantilever 113 or inside of the cantilever 113.

In an embodiment, at least one of the plurality of cantilevers may include a groove on one surface, and at least one of the plurality of strain sensors may be disposed on the groove.

In an embodiment, the IMU sensor may further include a polymer layer on the strain sensor disposed on the groove of the cantilever.

The polymer may include a viscoelastic or super elastic material. By the polymer coating, the cantilever 113 and the polymer layer form a sandwich structure with respect to the FBG sensing unit 130. The sandwich structure may improve the damping of the cantilever 113. Accordingly, when the cantilever 113 is deformed by an external force, it is possible to solve the residual vibration problem irrelevant to the external force. The polymer coating for the sandwich structure is provided for illustration purposes, and the polymer may be stacked using coating, forming and 3D printing.

Figure 4:
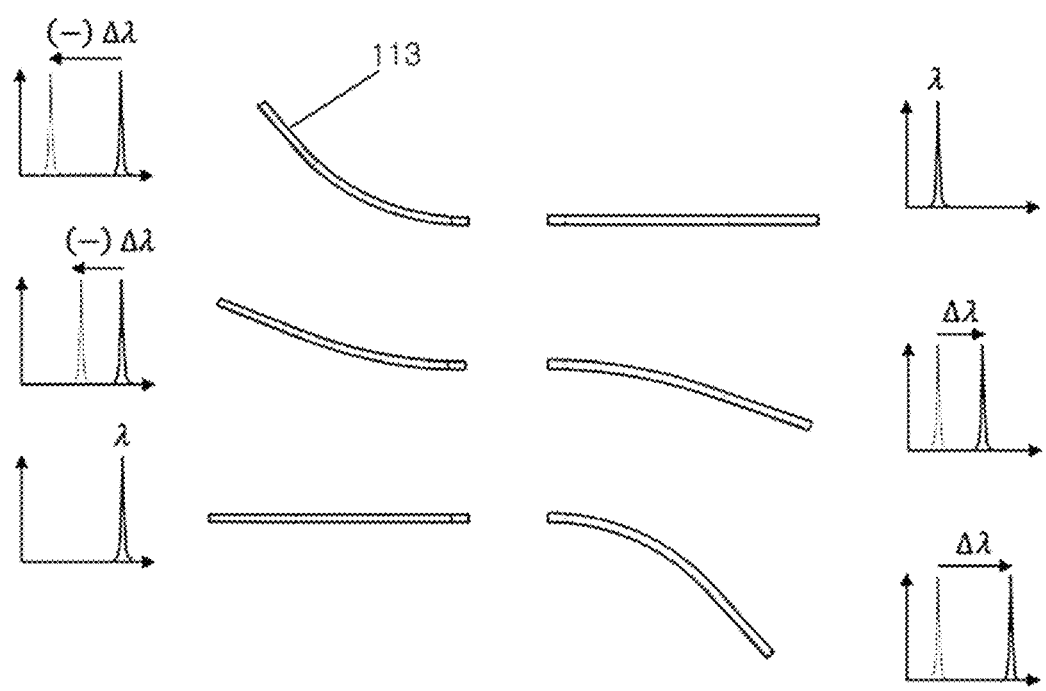
FIG. 4 is a schematic diagram of a process of acquiring acceleration information by an acceleration unit installed in a cantilever according to an embodiment of the present disclosure.

FIG. 4 is a schematic diagram of a process of acquiring the acceleration information by the FBG sensing unit 130 according to an embodiment of the present disclosure.

Referring to FIG. 4, the FBG sensing unit 130 is installed in the cantilever 113 such that all or part of the cantilever 113 may deform in response to a motion of the object on which the IMU sensor 10 is mounted.

When the cantilever 113 does not deform, the FBG sensing unit 130 does not deform. In contrast, when the cantilever 113 deforms, the FBG sensing unit 130 deforms, leading to a change in grating period.

When an external force is not applied to the cantilever 113, the cantilever 113 may maintain a basic condition. The basic condition is, for example, a condition in which a horizontal structure is maintained. When the cantilever 113 is not subjected to bending deformation, there is no change in wavelength of the reflected light of the FBG sensing unit 130.

When an external force is applied to the cantilever 113 such as movement of the object to which the IMU sensor 10 is attached, at least part of the cantilever 113 may be subjected to bending deformation. When the cantilever 113 bends or deforms, the grating period of the bent or deformed portion changes, and eventually, a shift in the wavelength spectrum of the reflected light may be observed in response to the bending or deformation of the cantilever 113.

For example, when the cantilever 113 is subjected to bending deformation in the downward direction of FIG. 4, the grating period A of the FBG sensing unit 130 is changed by the bending deformation of the cantilever 113. As a result, the wavelength of the reflected light changes.

Alternatively, when the cantilever 113 is subjected to bending deformation in the upward direction of FIG. 4, the grating period A of the FBG sensing unit 130 is changed by the bending deformation of the cantilever 113. As a result, the wavelength of the reflected light changes.

Additionally, the deformation direction of the cantilever 113 may be determined according to the direction in which the wavelength of the reflected light changes.

When the cantilever 113 bends in the downward direction of FIG. 4, the grating period A contracts. In contrast, when the cantilever 113 bends in the upward direction of FIG. 4, the grating period A expands. Since the direction of change of the grating period A is opposite, the direction of change of the wavelength is found opposite. For example, when the cantilever 113 bends in the downward direction of FIG. 4, the change in wavelength may have a negative value, and when the cantilever 113 bends in the upward direction of FIG. 4, the change in wavelength may have a positive value.

As described above, the change in wavelength of the reflected light indicates the deformation of the cantilever 113 and deformation information, and the movement direction of the wavelength indicates the deformation direction of the cantilever 113. The IMU sensor 10 may acquire information about whether an external force is applied or not, the strength of the external force and/or the direction of the external force using the sensor module 100.

In addition, the coupling of the cantilever 113 and the FBG sensing unit 130 may be configured to detect the change in strain better.

In an embodiment, the grating node 133 of the FBG sensing unit 130 is disposed further away from the fixed end of the cantilever 113 than the unfixed end of the cantilever 113. Thus, even when the same bending deformation occurs, there is a larger change in grating period A than bending deformation closer to the fixed axis.

It is because the closer to the fixed end, the less deformation.

Additionally, the cantilever 113 may have planar design for the IMU sensor 10 with higher sensitivity. For higher sensitivity, the cantilever 113 may be designed to include at least one through-hole, or the cantilever 113 may be designed such that a portion of the cantilever 113 has a slimmer planar structure than the other portion.

In an embodiment, when the cantilever 113 further includes the plurality of through-holes in one surface, the through-holes may be formed near the fixed end. The through-holes may come in different shapes, for example, trapezoidal, rectangular and circular shapes.

Additionally, the grating node 133 of the sensor 10 may be disposed between the plurality of through-holes. For example, the FBG sensing unit 130 may be disposed such that the grating node 133 of the FBG sensing unit 130 is located at an area between the trapezoidal through-holes shown in FIG. 3.

Referring back to FIG. 2, the FOG sensing unit 150 includes an optical fiber coil 151. The turns of the optical fiber coil 151 provide a Sagnac interferometer in which the phase of two beams of light traveling in opposite directions is changed by the rotation of the interferometer.

In the optical fiber coil 151, when two beams of light flow in opposite directions over different lengths of the coil, there are different travel times and a phase difference between the two beams of light. The phase difference AO is proportional to the number of turns N of the coil and the area A of the coil, and is inversely proportional to the wavelength of the beams of light. Under the Sagnac interferometer, the phase difference is proportional to the rotational angular velocity.

The IMU sensor 10 may calculate the rotation information such as the angular velocity information of the object on which the IMU sensor 10 is mounted, using the sensor module 100.

The sensor module 100 may be configured to detect the strain corresponding to the acceleration of each of the plurality of axes and/or the rotation information corresponding to the angular velocity.

In an embodiment, the sensor module 100 may include FBG sensing units 130a, 130b and/or 130c to detect the strain corresponding to x axis, y axis and/or z axis acceleration; and FOG sensing units 150a, 150b and/or 150c to detect the rotation information corresponding to x axis, y axis and/or z axis angular velocity.

For example, as shown in FIG. 2, the sensor module 100 may include the FBG sensing unit 130a to acquire x axis acceleration information, the FBG sensing unit 130b to acquire y axis acceleration information, the FBG sensing unit 130c to acquire z axis acceleration information; the FOG sensing unit 150a to acquire x axis angular velocity information, the FOG sensing unit 150b to acquire y axis angular velocity information, and the FOG sensing unit 150c to acquire z axis angular velocity information.

When the sensor module 100 includes the plurality of FBG sensing units 130, the sensor module 100 may include the plurality of cantilevers 113 corresponding to the FBG sensing units 130. For example, when the sensor module 100 includes the FBG sensing units 130a to 130c, the sensor module 100 may include the plurality of cantilevers 113a to 113c. The cantilevers 113a to 113c may be coupled to a portion of the core 110 in which the FOG sensing unit 150 is not installed.

The cantilevers 113a, 113b, 113c may be coupled to the core body 110 such that the extension direction of the corresponding cantilever 113 corresponds to (for example, is parallel to) x axis, y axis and z axis.

In an embodiment, the plane of the x axis cantilever 113a and the y axis cantilever 113b may be coupled to the core body 110, facing the same normal direction.

The core body 110 may have at least three surfaces having x axis, y axis and z axis as the surface direction. The core body 110 may be, for example, a hexahedron as shown in FIG. 2, but is not limited thereto, and may be various polyhedrons having three axial surfaces, such as octahedron.

In another embodiment, the core body 110 may be spherical in shape. In this case, the plurality of cantilevers 113 is coupled to the center point of the core body 110 in three axes.

Likewise, when the sensor module 100 includes the plurality of FOG sensing units 150, the sensor module 100 may include a plurality of leads 115 corresponding to the plurality of FOG sensing units 150.

The leads 115a, 115b, 115c may be formed in the core body 110 such that the step height direction of the lead 115 correspond to (for example, is parallel to) x axis, y axis and z axis.

The sensor module 100 supplies the output light of the FBG sensing unit 130 representing the strain information and the output light of the FOG sensing unit 150 representing the rotational speed information to the sensor circuit 200. The sensor circuit 200 supplies incident light to the optical fiber sensing units 130, 150, and processes the output light to generate the acceleration/angular velocity information.

Sensor Circuit

Figure 5:
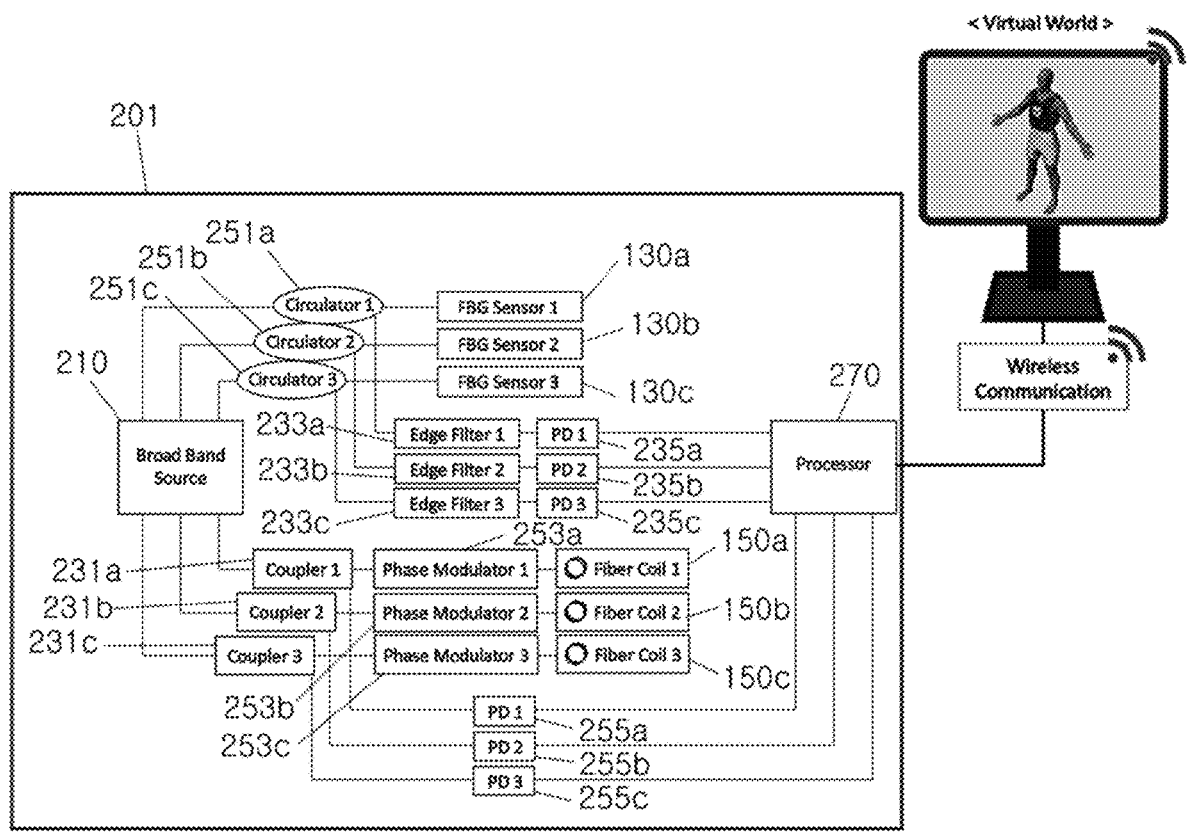
FIG. 5 is a schematic diagram of a sensor circuit according to an embodiment of the present disclosure.
Figure 6:
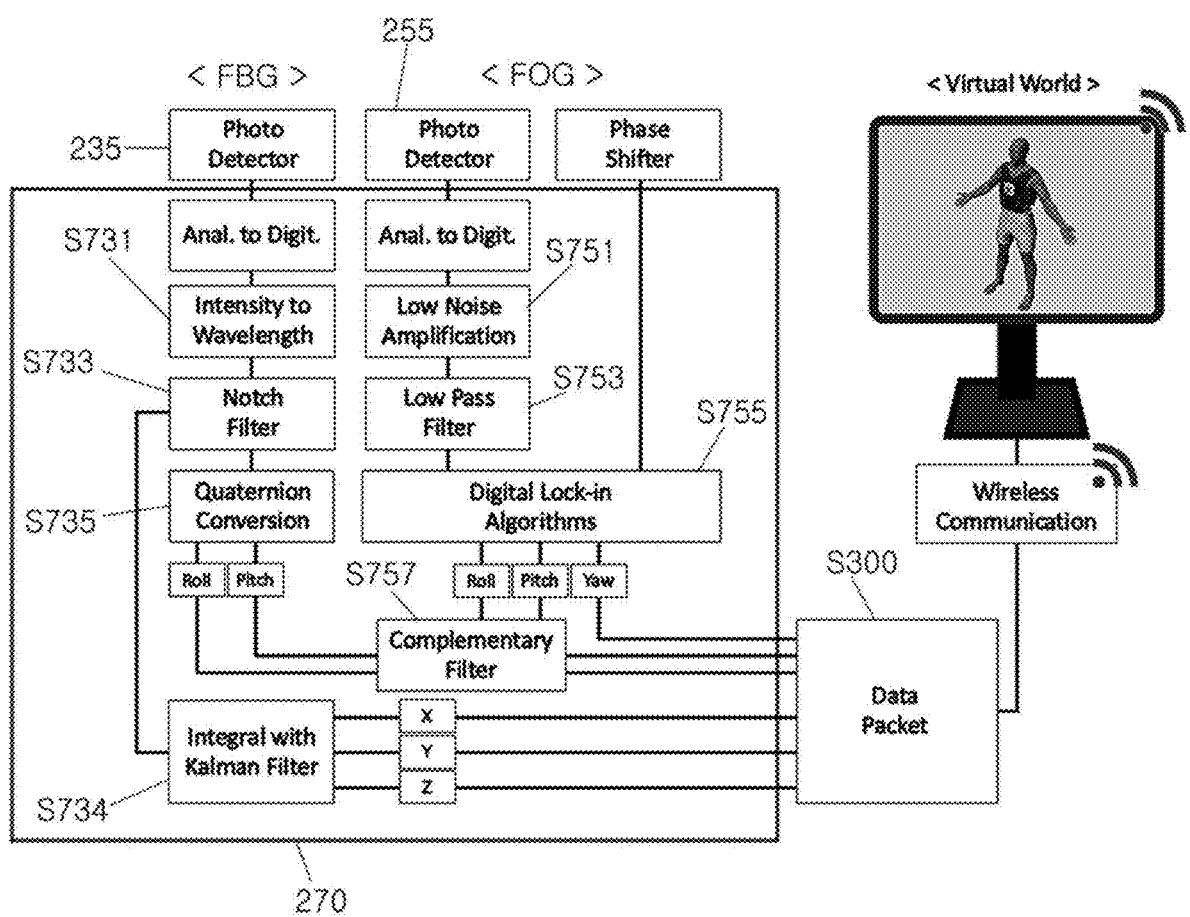
FIG. 6 is a diagram of sensor signal processing according to an embodiment of the present disclosure.

FIG. 5 is a schematic diagram of the sensor circuit according to an embodiment of the present disclosure, and FIG. 6 is a diagram of sensor signal processing according to an embodiment of the present disclosure.

Referring to FIGS. 5 and 6, the sensor circuit 200 includes a substrate 201; a light source 210; an optical interconnect element 231; a filter 233; a detection unit 235; an optical interconnect element 251; a phase modulator 253; a detection unit 255; and a calculator 270.

The optical interconnect elements 231, 251 optically connect the components to allow light propagation between the components. The optical interconnect elements 231, 251 may include, for example, a coupler, an isolator and a circulator.

The substrate 201 supports all or some of the components 210, 233, 235, 253, 255, 270 of the sensor circuit 200. The substrate 201 may include, for example, a microcontroller (MCU) board and a PCB board.

The light source 210 supplies incident light to the FBG sensing unit 130 and the FOG sensing unit 150. The light source 210 is configured to supply incident light having frequencies in which a change in wavelength spectrum at the FBG sensing unit 130 and a change in phase difference at the FOG sensing unit 150 can be observed. The light source 210 may be, for example, a broadband source.

The sensor circuit 200 has a first optical path along which incident light of the light source 210 is supplied to the FBG sensing unit 130 and the output light of the FBG 130 propagates to the calculator 270; and a second optical path along which incident light of the light source 210 is supplied to the FOG sensing unit 150 and the output light of the FOG sensing unit 150 propagates to the calculator 270.

In the first optical path, the light source 210 supplies incident light to the FBG sensing unit 130 through the optical interconnect element 231. The output light of the FBG sensing unit 130 propagates to the filter 233 and the detection unit 235 through the optical interconnect element 231.

When the sensor module 100 includes the plurality of FBG sensing units 130a to 130c, the light source 210 may be connected to supply incident light to each of the plurality of FBG sensing units 130. For example, as shown in FIG. 5, the sensor circuit 200 may include circulators 203a to 203c between the light source 210 and the plurality of FBG sensing units 130a to 130c, and filters 233a to 233c and detection units 235a to 235c between the calculator 270 and the circulators 203a to 203c.

When an optical signal of a specific wavelength passes through the filter 233, the filter 233 is configured to change the intensity depending on the wavelength. The filter 233 may be, for example, an edge filter. The wavelength of the reflected light at the FBG sensing unit 130 may be demodulated by the filter 233.

In the second optical path, the light source 210 supplies incident light to the FOG sensing unit 150 through the optical interconnect element 251. The output light of the FOG sensing unit 150 propagates to the phase modulator 253 and the detection unit 255 through the optical interconnect element 251. The optical interconnect element 251 and the phase modulator 253 of the second optical path form a Sagnac interferometer.

When the sensor module 100 includes the plurality of FBG sensing units 130a to 130c, the light source 210 may be connected to supply incident light to each of the plurality of FBG sensing units 130. For example, as shown in FIG. 5, the sensor circuit 200 may include circulators 203a to 203c between the light source 210 and the plurality of FBG sensing units 130a to 130c, and filters 233a to 233c and detection units 235a to 235c between the calculator 270 and the circulators 203a to 203c.

The phase modulator 253 is configured to modulate the optical signal propagating through the second optical path based on a modulation signal. The wavelength of the output light at the FOG sensing unit 150 may be demodulated using the modulation signal of the phase modulator 253. The phase modulator 253 extracts phase information of light representing the phase difference from the input light. Thus, the rotation information that is proportional to the phase information is acquired, and eventually, the angular velocity information is calculated.

The detection units 235, 255 convert the incident optical signal into an electrical signal. The detection units 235, 255 may be, for example, Photo Detectors (PDs).

The detection unit 235 converts the reflected light of the FBG sensing unit 130 from the filter 233 into an electrical signal. The detection unit 255 converts the output light of the FOG sensing unit 150 from the phase modulator 253 into an electrical signal.

The detection units 235, 255 transmit the converted electrical signal to the calculator 270.

The calculator 270 includes at least one processor, and is configured to calculate the acceleration information and/or the angular velocity information based on input information.

The calculator 270 receives the electrical signal of the FBG sensing unit 130 representing the strain as the wavelength spectrum from the detection unit 235. The calculator 270 may calculate the strain applied to the cantilever 113 based on a change in wavelength spectrum. The calculator 270 calculates the acceleration of the IMU sensor 10 having the cantilever 113 based on the calculated strain. The acceleration of the IMU sensor 10 may correspond to the acceleration of the object located at the same inertial frame.

The calculator 270 receives the electrical signal of the FOG sensing unit 150 representing the phase difference of the FOG sensing unit 150 from the detection unit 255. The calculator 270 may calculate the rotation information based on the phase difference. The calculator 270 calculates the angular velocity of the IMU sensor 10 having the optical fiber coil 151 based on the calculated rotation information. The angular velocity of the IMU sensor 10 may correspond to the angular velocity of the object located at the same inertial frame.

In an embodiment, the calculator 270 may calculate the rotation information based on the strain from the FBG sensing unit 130 and the rotation information from the FOG sensing unit 150.

Figure 7:
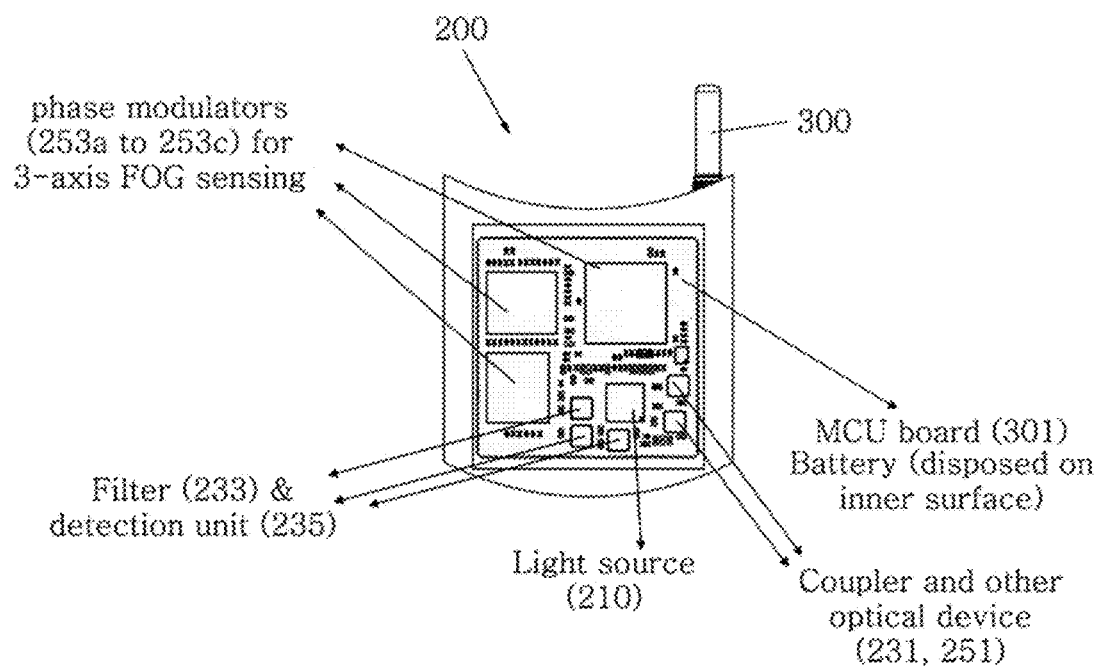
FIG. 7 is a diagram showing the operation of a calculator according to an embodiment of the present disclosure.

FIG. 7 is a diagram showing the operation of the calculator according to an embodiment of the present disclosure.

Referring to FIG. 7, the calculator 270 generates wavelength intensity information based on the electrical signal of the FBG sensing unit 130 converted by the detection unit 235 (S731); and calculates acceleration information based on the electrical signal of the FBG sensing unit 130 (S733).

The calculator 270 may include a notch filter. The x axis acceleration, y axis acceleration and z axis acceleration are calculated by the notch filter 272 (S733).

Additionally, the calculator 270 may be configured to calculate a movement distance based on the calculated acceleration information (S734) and/or calculate a rotation angle based on the calculated acceleration information (S735).

The calculator 270 may include a Kalman filter. The movement distance of the IMU sensor 10 may be calculated by tracking the acceleration by the Kalman filter 274 (S734).

The calculator 270 may convert the acceleration information into the rotation angle through a conversion algorithm (S735). The conversion algorithm may be, for example, Quaternion conversion, but is not limited thereto. The calculator 270 detects a change in gravitational acceleration from the x and y axis acceleration values and calculates a roll-wise rotation angle and a pitch-wise rotation angle.

Meanwhile, the calculator 270 is configured to amplify the phase difference component in the electrical signal of the FOG sensing unit 150 converted by the detection unit 255 (S751); extract the amplified phase difference component (S753); and calculate rotation information based on phase transmission and the extracted phase difference, and calculate the angular velocity based on the rotation information (S755).

Additionally, the calculator 270 may be further configured to calculate the rotation angle based on the angular velocity (S757).

The calculator 270 may include a low noise amplifier and a low-pass filter. The phase difference component is amplified and extracted by the low noise amplifier and the low-pass filter.

The calculator 270 calculates a roll angle, a pitch angle and a yaw angle by the integration of the x, y, z axis angular velocity of the angular velocity sensor.

In an embodiment, the calculator 270 may calculate the roll angle and the pitch angle of the IMU sensor 10 based on the roll angle and the pitch angle based on the electrical signal of the FOG sensing unit 150 and the roll angle and the pitch angle based on the electrical signal of the FBG sensing unit 130.

As described above, the roll angle and the pitch angle based on the electrical signal of the FBG sensing unit 130 is calculated using the gravitational acceleration. Hence, as long as there is no change in gravitational acceleration, the angle value is very accurate.

In contrast, the roll angle and the pitch angle based on the electrical signal of the FOG sensing unit 150 are calculated by the integration of the rotational speed. Hence, there is a relatively large error, and the error increases in the integration process.

Accordingly, the calculator 270 may not directly use the roll angle and the pitch angle based on the electrical signal of the FOG sensing unit 150 based on the angular velocity as the roll angle and the pitch angle of the IMU sensor 10.

In an embodiment, the calculator 270 may calculate the roll angle $\theta_{R\_Final}$) and the pitch angle $\theta_{P\_Final}$ of the IMU sensor 10 through the following Equation.

$$\theta_{P\_Final} = \alpha \times ((\dot{\theta}_y \times \Delta t) + \theta_{P\_prev}) + (1-\alpha) \times \theta_{P\_acc}$$

$$\theta_{R\_Final} = \alpha \times ((\dot{\theta}_x \times \Delta t) + \theta_{R\_prev}) + (1-\alpha) \times \theta_{R\_acc} \quad \text{[Equation 1]}$$

Here, α is a system parameter, and may be set to an optimal value by experimental results. $\theta_{P\_prev}$ denotes the previous pitch angle acquired through the angular velocity, $\theta_{R\_prev}$ denotes the previous roll angle acquired through the angular velocity, $\theta_{P\_acc}$ denotes the pitch angle acquired through the acceleration, $\theta_{R\_acc}$ denotes the roll angle acquired through the acceleration sensor, and Δt denotes a sampling time (for example, a measurement time).

In addition to the acceleration for each axis and the angular velocity for each axis, the calculator 270 may calculate the rotation angle for each axis.

Figure 8:
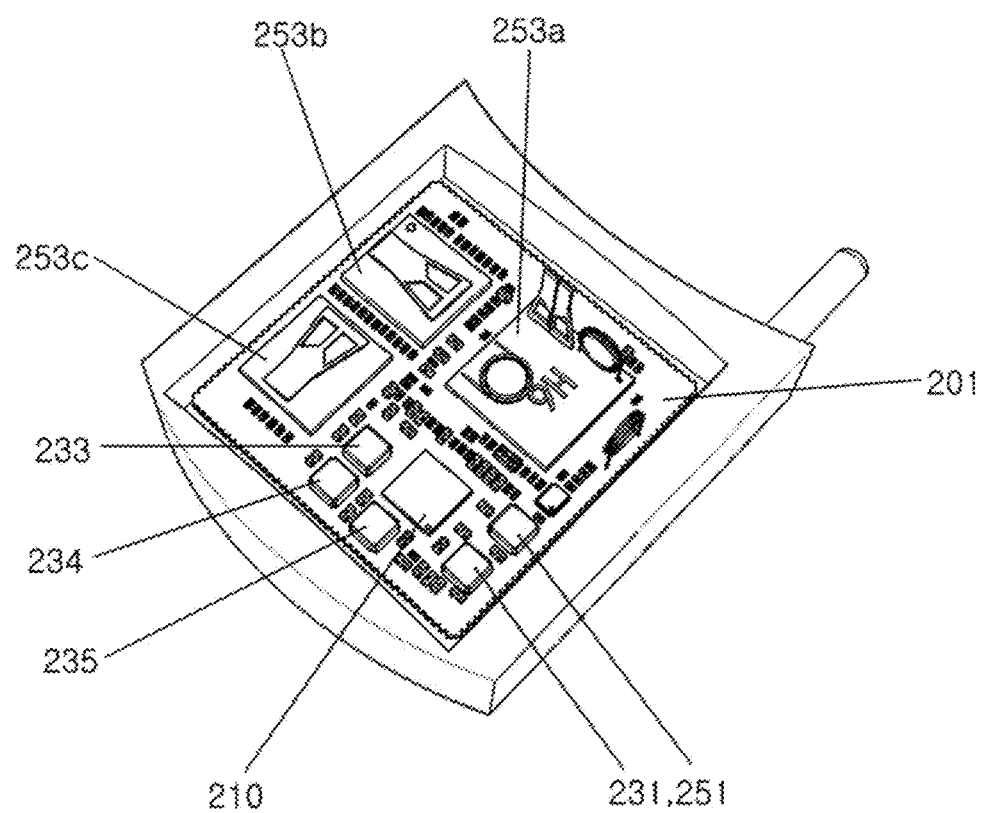
FIG. 8 is a diagram of a sensor circuit with a compact sensor module according to another embodiment of the present disclosure.

FIG. 8 is a diagram of the sensor circuit 200 with the compact sensor module 100 according to another embodiment of the present disclosure.

Referring to FIG. 8, the sensor module 100 may be connected to the sensor circuit 200 in a manner that the size of the sensor case 400 is relatively reduced.

In this embodiment, the sensor module 100 may not include the core body 110. At least one of the components (for example, 210, 233, 235, 253, 255 270) in the sensor module 100 may be incorporated into a micro-chip.

At least some of the optical fiber sensing units 130, 150 may be disposed on the substrate 201 or the integrated components on the substrate 201. The optical fiber sensing units 130, 150 may be disposed on the component (for example, 253) incorporated into a chip or the substrate.

A certain FBG sensing unit 130 may be disposed on the surface of the chip of the component through a certain cantilever 113, and another cantilever 113 may be directly disposed on the substrate 201. The chip on which the FBG sensing unit 130 will be disposed may be a chip having a wide area.

For example, the cantilevers 113a, 113b may be disposed on the surface of at least two chips among the phase modulators 253a to 253c having a wider area, and the cantilever 113c may be directly disposed on the substrate 201.

At least one cantilever 113c may be disposed in the normal direction to the other cantilevers 113a, 113b.

Likewise, a certain optical fiber coil 151 may be disposed on the component and another cantilever 113 may be directly disposed on the substrate 201. For example, the coils 151a, 151b may be disposed on the substrate, and the other coil 151c may be disposed on the phase modulator 253.

The at least one optical fiber coil 151c may be disposed in a normal direction to the other cantilevers 113a, 113b.

The IMU sensor 10 may be mounted on a human body and may be used to perform a motion capture operation.

Figure 9A:
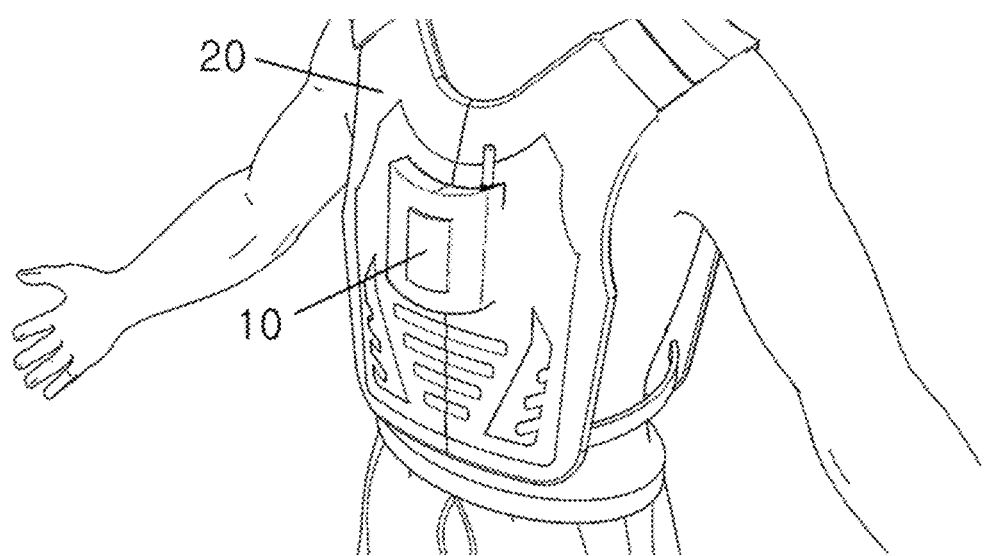
FIGS. 9A and 9B are schematic diagrams of a motion capture device according to another aspect of the present disclosure.
Figure 9B:
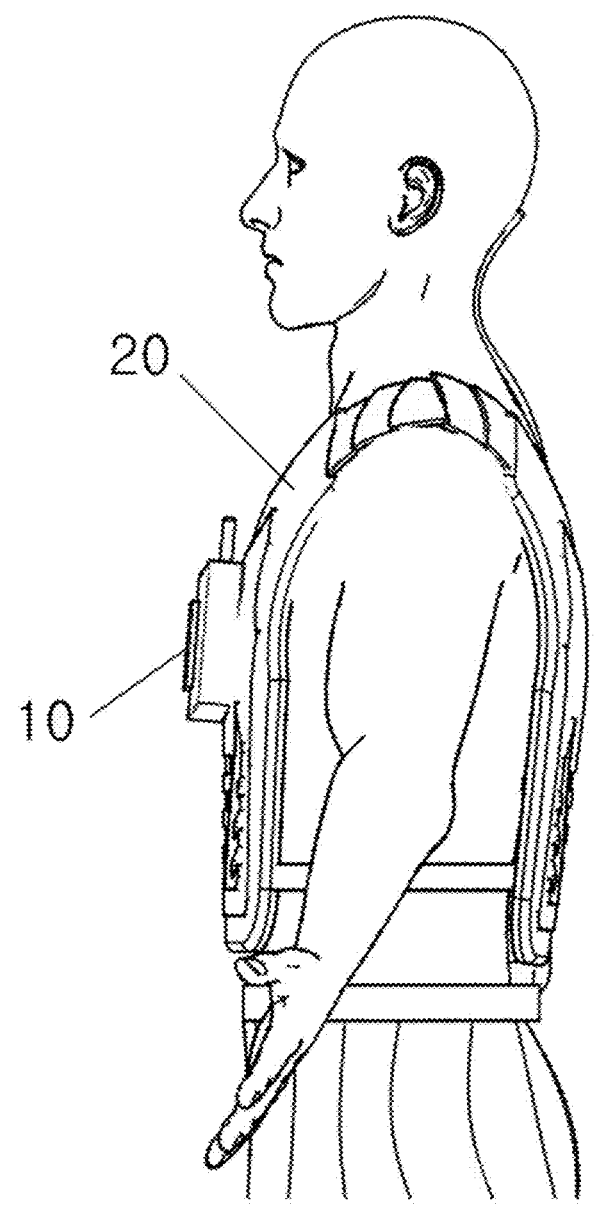

FIGS. 9A and 9B are schematic diagrams of a motion capture device according to another aspect of the present disclosure.

Referring to FIGS. 9A and 9B, the motion capture device may include: the IMU sensor 10; and a fixing element 20 to fix the IMU sensor 10 to a user's body. The fixing element 20 may include a band and any other wearable tool.

The IMU sensor 10 is fixed to the user's body by the fixing element 20. When the user makes a movement, the IMU sensor 10 may measure the acceleration/angular velocity of the user.

Additionally, the IMU sensor 10 may be further configured to measure the rotation angle and movement distance.

It will be obvious to those skilled in the art that the IMU sensor 10 may include any other component. For example, the IMU sensor 10 may include any other hardware element necessary for the operations described herein, including a network interface, an input device for data entry, and a display, a printer or any other output device for data display.

While the present disclosure has been hereinabove described with reference to the embodiments shown in the drawings, this is provided by way of illustration and those skilled in the art will understand that various modifications and variations may be made thereto. However, it should be understood that such modifications fall within the scope of technical protection of the present disclosure. Accordingly, the true technical protection scope of the present disclosure should be defined by the technical spirit of the appended claims.

What is claimed is:

1. An optical fiber-based Inertia Measurement Unit (IMU) sensor for measuring an acceleration and an angular velocity of an object on which the IMU sensor is mounted, the IMU sensor comprising:
   a sensor module including at least one first type of sensing sensor to detect a change in strain to generate first output light, and at least one second type of sensing sensor to detect a change in rotational speed to generate second output light;
   a sensor circuit to generate strain information including the change in strain based on the first output light of the first type of optical fiber sensing sensor, calculate acceleration information of the object on which the IMU sensor is mounted based on the strain information, generate rotation information based on the output light of the second type of optical fiber sensing sensor, and calculate angular velocity information of the object based on the rotation information; and
   a sensor case to protect the sensor module and the sensor circuit,
   wherein the sensor module includes at least one cantilever configured to deform when an external force is applied,
   wherein the at least one cantilever is one of a plurality of cantilevers,
   wherein at least one of the plurality of cantilevers includes a groove on a surface, and
   wherein at least one of a plurality of strain sensors is disposed on the groove.

2. The IMU sensor according to claim 1, wherein the first type of sensing sensor is a Fiber Bragg grating (FBG) sensing unit including at least one grating node, and
   wherein the second type of sensing sensor is a Fiber-Optic Gyro (FOG) sensing unit including an optical fiber coil.

3. The IMU sensor according to claim 2,
   wherein the FBG sensing unit is disposed along the cantilever.

4. The IMU sensor according to claim 3, wherein the sensor module further includes a core body, and
   wherein an end of each cantilever is coupled to the core body.

5. The IMU sensor according to claim 4, wherein the core body includes at least one lead, and
   wherein each optical fiber coil is coupled to each lead.

6. An optical fiber-based Inertia Measurement Unit (IMU) sensor for measuring an acceleration and an angular velocity of an object on which the IMU sensor is mounted, the IMU sensor comprising:
   a sensor module including at least one first type of sensing sensor to detect a change in strain to generate first output light, and at least one second type of sensing sensor to detect a change in rotational speed to generate second output light;
   a sensor circuit to generate strain information including the change in strain based on the first output light of the first type of optical fiber sensing sensor, calculate acceleration information of the object on which the IMU sensor is mounted based on the strain information, generate rotation information based on the output light of the second type of optical fiber sensing sensor, and calculate angular velocity information of the object based on the rotation information; and
   a sensor case to protect the sensor module and the sensor circuit,
   wherein the first type of sensing sensor is a Fiber Bragg grating (FBG) sensing unit including at least one grating node,
   wherein the sensor module includes at least one cantilever configured to deform when an external force is applied,
   wherein the FBG sensing unit is disposed along the cantilever, and
   wherein the at least one cantilever has a plurality of through-holes, and the grating node of the FBG sensing unit is disposed between the plurality of through-holes.

7. An optical fiber-based Inertia Measurement Unit (IMU) sensor for measuring an acceleration and an angular velocity of an object on which the IMU sensor is mounted, the IMU sensor comprising:
   a sensor module including at least one first type of sensing sensor to detect a change in strain to generate first output light, and at least one second type of sensing sensor to detect a change in rotational speed to generate second output light;
   a sensor circuit to generate strain information including the change in strain based on the first output light of the first type of optical fiber sensing sensor, calculate acceleration information of the object on which the IMU sensor is mounted based on the strain information, generate rotation information based on the output light of the second type of optical fiber sensing sensor, and calculate angular velocity information of the object based on the rotation information; and
   a sensor case to protect the sensor module and the sensor circuit,
   wherein the first type of sensing sensor is a Fiber Bragg grating (FBG) sensing unit including at least one grating node,
   wherein the sensor module includes at least one cantilever configured to deform when an external force is applied,
   wherein the FBG sensing unit is disposed along the cantilever, and
   wherein the grating node of the FBG sensing unit is disposed closer to an unfixed opposite end than the end of the cantilever coupled to the core body on the cantilever.

8. The IMU sensor according to claim 4, further comprising:
   at least one support to position the core body at an inner center of the sensor case.

9. The IMU sensor according to claim 3, wherein a plurality of FBG sensing units is installed to measure the acceleration information for each axis of x axis, y axis and z axis, and
   wherein a plurality of FOG sensing units is installed to measure the angular velocity information for each axis of x axis, y axis and z axis.

10. An optical fiber-based Inertia Measurement Unit (IMU) sensor for measuring an acceleration and an angular velocity of an object on which the IMU sensor is mounted, the IMU sensor comprising:
    a sensor module including at least one first type of sensing sensor to detect a change in strain to generate first output light, and at least one second type of sensing sensor to detect a change in rotational speed to generate second output light;
    a sensor circuit to generate strain information including the change in strain based on the first output light of the first type of optical fiber sensing sensor, calculate acceleration information of the object on which the IMU sensor is mounted based on the strain information, generate rotation information based on the output light of the second type of optical fiber sensing sensor, and calculate angular velocity information of the object based on the rotation information; and a sensor case to protect the sensor module and the sensor circuit, wherein the sensor circuit includes a substrate, a light source, at least one first optical interconnect element, at least one filter, at least one first detection unit, at least one second optical interconnect element, at least one phase modulator, at least one second detection unit and a calculator, wherein the light source supplies incident light to the first optical fiber sensing sensor and the second optical fiber sensing sensor, wherein the first optical interconnect element and the second optical interconnect element are couplers or circulators, wherein when an optical signal of a specific wavelength passes through the filter, the filter is configured to change an intensity depending on the wavelength, wherein the phase modulator demodulates the second output light of the second optical fiber sensing sensor based on a modulation signal, wherein the first detection unit and the second detection unit convert, into an electrical signal, the first output light and the second output light processed by the filter and the phase modulator, and wherein the calculator is configured to calculate the strain applied to the cantilever based on a change in wavelength spectrum represented in the electrical signal of the first detection unit, calculate the acceleration of the object based on the calculated strain, calculate rotational speed information of the object based on a phase shift represented in the electrical signal of the second detection unit, and calculate the angular velocity of the object based on the calculated rotational speed information.

11. The IMU sensor according to claim 10, wherein the sensor circuit includes a first optical path and a second optical path, wherein the first optical path is an optical path along which incident light is supplied to the first optical fiber sensing sensor through the first optical interconnect element by the light source, and the first output light of the first optical fiber sensing sensor propagates to the filter and the first detection unit through the optical interconnect element, and wherein the second optical path is an optical path along which incident light is supplied to the second optical fiber sensing sensor through the second optical interconnect element by the light source, and the second output light of the second optical fiber sensing sensor propagates to the phase modulator and the second detection unit through the optical interconnect element.

12. The IMU sensor according to claim 10, wherein when the plurality of first optical fiber sensing sensors is included to measure the acceleration in a plurality of axes, the sensor circuit includes a plurality of the first optical interconnect elements, a plurality of the filters and a plurality of the first detection units, corresponding respectively to the plurality of axes.

13. The IMU sensor according to claim 10, wherein when the plurality of first optical fiber sensing sensors is included to measure the angular velocity in a plurality of axes, the sensor circuit includes the plurality of second optical interconnect elements, the plurality of phase modulators and the plurality of second detection units, corresponding respectively to the plurality of axes.

14. The IMU sensor according to claim 10, wherein when the calculator calculates the angular velocity in a plurality of axes, the calculator is further configured to calculate a roll-wise rotation angle and a pitch-wise rotation angle by integration of the angular velocities in the axes.

15. The IMU sensor according to claim 13, wherein when the calculator calculates the acceleration in the plurality of axes, the calculator is further configured to:
detect a change in gravitational acceleration from acceleration values in the axes and calculate a roll-wise rotation angle and a pitch-wise rotation angle; and
calculate a roll-wise rotation angle and a pitch-wise rotation angle of the object based on the roll-wise rotation angle and the pitch-wise rotation angle with the angular velocity and the roll-wise rotation angle and the pitch-wise rotation angle with the acceleration.

16. The IMU sensor according to claim 10, wherein at least one of the filter, the phase modulator, the first detection unit or the second detection unit is incorporated into a chip, and wherein at least one of the first optical sensing sensor or the second optical sensing sensor is disposed on a surface of the substrate or the chip.

17. The IMU sensor according to claim 10, further comprising:

a communication module to generate a transmission packet including acceleration data and angular velocity data based on the acceleration information and the angular velocity information of the object calculated by the sensor circuit, and transmit the generated transmission packet to an external device.

18. A motion capture device, comprising:
the Inertia Measurement Unit (IMU) sensor according to claim 1; and
a fixing element to fix the IMU sensor to a user's body.

* * * * *